Sept. 15, 1959 E. G. SCHWARM ET AL 2,904,253

SERVO MULTIPLIER HAVING REDUCED ERROR

Filed Jan. 4, 1957

CARROL L. DUREN
EDWARD G. SCHWARM
INVENTOR

BY Darby & Darby
ATTORNEY

United States Patent Office 2,904,253

Patented Sept. 15, 1959

2,904,253

SERVO MULTIPLIER HAVING REDUCED ERROR

Edward G. Schwarm and Carrol L. Duren, Binghamton, N.Y., assignors to Link Aviation, Inc., Binghamton, N.Y., a corporation of New York Application January 4, 1957, Serial No. 632,569

3 Claims. (Cl. 235—194)

Figure 1A:
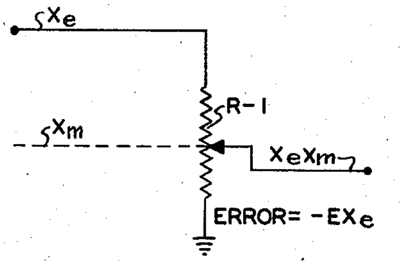
FIG. 1a PRIOR ART

This invention relates to analog computer automatic control and instrumentation apparatus, and more particularly to improved apparatus for "squaring." In electrical analog computers a real or simulated variable $x$ may be represented by a number of different physical magnitudes or parameters, two common examples being a voltage $X_e$ commensurate with (most usually directly proportional to) the variable $x$, in volts or millivolts per unit of $x$, or by a mechanical position analog, $x_m$, proportional to $x$ in either radians per unit of $x$ or linear units per unit of $x$, depending upon whether the mechanical analog varies by rotation or translation, respectively. Frequently it is necessary or desirable in analog computer apparatus to generate an analog computer quantity commensurate with the function $x^2$ (the analog of the square of the variable $x$) using either or both the voltage analog $X_e$ and the mechanical analog $X_m$ to derive the desired squared quantity. A typical example is the computation of simulated aerodynamic lift L in flight simulators, wherein either $V^2$ (airspeed squared) or $M^2$ (Mach Number squared) may be multiplied by a function of simulated altitude to determine lift. A number of means have been employed in prior art apparatus for squaring analog compter quantities. One prior art method is to apply the $X_e$ voltage analog to excite the winding of a linear potentiometer having its wiper arm positioned in accordance with the mechanical analog $X_m$. If certain errors are neglected, the voltage appearing on the arm of the potentiometer may be considered to be proportional to the quantity $x^2$. A second common prior art arrangement comprises the use of a pair of cascaded linear potentiometers. A voltage is applied to excite the winding of a first of the potentiometers, and the voltage on the arm of the first potentiometer is applied (often through an isolation or buffer circuit) to excite the winding of the second potentiometer. The wiper arm of both potentiometers are positioned by the mechanical analog quantity $X_m$, and the potential appearing on the arm of the second potentiometer varies, with certain errors, in accordance with the square of the variable $x$.

A further prior art arrangement for deriving a squared quantity involves the use of diode shaping circuits. A plurality of diodes are biased so as to begin conducting at different various values of an $X_e$ voltage applied to them, and by proper selection of diodes and resistors an output voltage which varies approximately in accordance with the square of the variable $x$ may be provided. Each of the above mentioned prior art squaring arrangements have certain limitations which render their use undesirable in certain analog computer apparatus. Certain errors which arise in the squared quantity computed by means of the prior art arrangements are considerably lessened by use of the present invention.

It is therefore the primary object of the invention to provide improved apparatus for more accurately providing analog computer potentials commensurate with the square of an analog variable.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 1B:
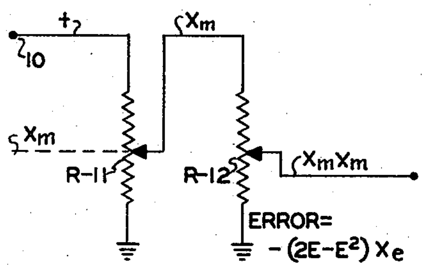
FIG. 1b PRIOR ART
Figure 1C:
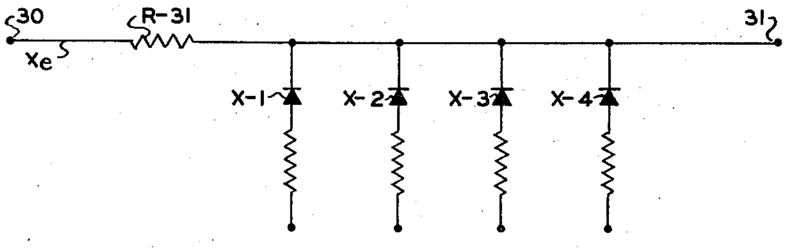
FIG. 1c PRIOR ART
Figure 2:
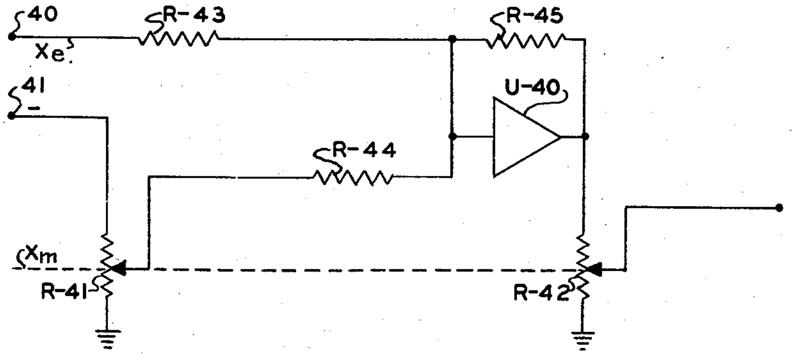

For a fuller understanding of the nature and objects of the invention reference should be had to the following detailed description taken in connection with the accompanying drawing, in which:

Figs. 1*a*, 1*b* and 1*c* illustrate three prior art squaring arrangements in schematic form; and Fig. 2 illustrates an exemplary embodiment of the invention in electrical schematic form.

In analog computer apparatus, most voltages are more accurate analogs of the quantities which they are intended to represent than are mechanical positions, since generally speaking and particularly considering dynamic operation, available electrical circuits are considerably more accurate than mechanical arrangements, due to the inherent inertia and backlash of mechanical elements. The better accuracy of electrical voltages is particularly evident in computers in which mechanical position quantities are derived from previously computed electrical quantities, which derivation often is accomplished by means of electrical servomechanisms. A contemporary servomechanism responsive to a substantially error-free electrical voltage $X_e$ provides a mechanical shaft position $X_m$ which may be in error due to the velocity lag, overshoot and other inherent limitations of the servomechanism. For the above reason, electrical analogs usually are considered more accurate than mechanical analogs, and the analysis herein will assume that $X_e$ is a true or correct analog of the variable $x$.

The error E may be defined as the difference between $X_e$ and $X_m$ written as a fraction of $X_e$, or stated algebraically:

$$\text{Percent } E=\frac{X_e-X_m}{X_e} \quad (1)$$

or $$X_m=X_e(1-E) \quad (2)$$

Reference may now be had to Fig. 1, which illustrates the three specifically above-mentioned prior are squaring arrangements. In Fig. 1*a* the electrical analog potential $X_e$ is applied to excite the winding of linear potentiometer R–1, the wiper arm of which is positioned by the mechanical analog quantity $X_m$. Inasmuch as the electrical potential may be considered error-free, an error-free potential gradient will exist across the potentiometer winding. However, mechanical position analog $X_m$ may be in error by amount E, so that the output voltage on the arm of potentiometer R–1 may be in error. It will be seen that the output voltage on the arm of the potentiometer, which voltage is intended to be commensurate with $X^2$, will be commensurate with $X_eX_m$, or stated algebraically, $$x_0^2=X_eX_m \quad (3)$$

Substituting for $X_m$ in the above equation in accordance with Expression 2:

$$X_0^2=X_e^2(1-E) \quad (4)$$

Inasmuch as the correct squared quantity would be proportional to the square of the accurate quantity $x_e$, comparison of Expression 4 with $X_e^2$ indicates that the net error in the squared output quantity voltage on the arm of potentiometer R–1 is commensurate with $(-EX_e)$.

In Fig. 1*b* a potential is applied at terminal 10 to excite the winding of potentiometer R–11, the arm of which is positioned in accordance with the mechanical analog quantity $X_m$. The potential applied to excite potentiometer R–11 may be either a fixed potential or a varying potential, depending upon whether the squared quantity is desired to be a multiplier of another computer quantity or merely the squared quantity itself, as is well known to those skilled in the art. Assuming for purposes of explanation that a fixed voltage from the computer power supply is applied to excite potentiometer R–11, it will be seen that a voltage proportional to $X_m$ appears on the arm of potentiometer R–11. This voltage is applied (through a buffer circuit if desired) to excite the winding of potentiometer R–12, the arm of which also is positioned by the mechanical analog quantity $X_m$. Now it may be seen that the squared quantity output voltage $x_0^2$ on the arm of potentiometer R–12 is commensurate with $X_mX_m$.

Substituting from Equation 2, the following expressions may be written for the output voltage on the arm of potentiometer R–12:

$$x_0^2=x_e^2(1-E)^2 \quad (5)$$

$$x_0^2=x_e^2(1-2E+E_2) \quad (6)$$

Comparing Expression 6 with $X_e^2$, the theoretically accurate squared quantity, it may be seen that the net error in the squared quantity computed with the arrangement of Fig. 1*b* is proportional to $-(2E-E^2)X_e$.

In Fig. 1*c* there is shown a rudimentary squaring circuit consisting of a plurality of variously biased diodes X–1, X–2, X–3 and X–4. The input voltage applied at terminal 30 determines the potential level on the anodes of all of the diodes shown. The various diode cathodes are connected to different fixed power supply voltages so that each diode begins to conduct at a different level of input voltage $X_e$. By appropriate selection of diodes and resistors, the output voltage at terminal 31 may be made to vary approximately in accordance with the square of the $X_e$ applied to the circuit. While such an all-electronic squaring arrangement does not suffer from the dynamic limitations of a squaring arrangement which utilizes the mechanical analog quantity, it is well known that the output voltage is only an approximation of the theoretically correct squared quantity, and that a rather large number of diodes are required if the error is to be maintained at a low value over the entire range of operation of the circuit. The all-electronic arrangement of Fig. 1*c* also suffers from the fact that it is unidirectional and due to the fact that changes in diode emission due to age and other factors tend to make the circuit inaccurate. The error in the output potential of the electronic circuit of Fig. 1*c* depends upon the number and type of diodes utilized, and cannot be set forth conveniently except in empirical fashion.

Two further prior art techniques sometimes used for squaring involve the use of a potentiometer having a non-linear winding or the use of a linear potentiometer winding and a squaring motion converting mechanism. Neither of these devices have met with great favor, since non-linear windings and non-linear motion converting mechanisms are quite expensive if made with the usually required degree of accuracy. Assuming that the potentiometer winding is shaped accurately to provide a square function, or that an accurate squaring motion converting mechanism is made, the errors provided in the output voltage from either device will be similar in magnitude to that of the arrangement of Fig. 1*b*, or expressed mathematically, $-(2E-E^2)X_e$.

Referring now to Fig. 2, there is shown an exemplary embodiment of a squaring arrangement constructed in accordance with the present invention. The electrical analog potential $X_e$ is applied at terminal 40 via a buffer means (not shown) if desired, and via scaling resistor R–43 to the input circuit of a conventional analog computer summing device shown as comprising a conventional operational amplifier U–40 having a feedback resistance R–45 connected between its input and output circuits. A negative potential from the computer power supply is applied at terminal 41 to excite the winding of linear potentiometer R–41, the wiper arm of which is positioned by the mechanical analog quantity $X_m$. The potential on the arm of potentiometer R–41 is applied via a buffer (not shown) if desired, and via scaling resistor R–44 to the input circuit of the summing means. The mechanical analog quantity $X_m$ in Fig. 2 is the same as that discussed above, being proportional to $X_e$ except for the above noted errors.

The electrical analog quantity $X_e$ will vary in accordance with predetermined scaling, so that the quantity $X_e$ represents a predetermined number of units per volt. Similarly, the mechanical analog quantity $X_m$ will represent a predetermined number of units per degree of rotation or per degree of linear translation, and with a given potentiometer utilized as potentiometer R–41, the potential on the arm of potentiometer R–41 will vary in accordance with a known number of volts per unit change of the physical quantity it represents. With these facts in mind, scaling resistor R–43 is selected with relation to scaling resistor R–44 and feedback resistor R–45 so that a unit voltage change at terminal 40 will change the output potential from amplifier U–40 twice as much as a unit voltage change at the arm of potentiometer R–41. Otherwise stated, scaling resistor R–43 has twice the conductance of scaling resistor R–44. It also should be noted that the potentials applied to amplifier U–40 through scaling resistors R–43 and R–44 are opposite in sense with respect to each other, the potential from resistor R–43 being shown as positive with respect to a reference level (ground) and the potential from resistor R–44 being shown as negative with respect to the reference level.

As will be apparent to those skilled in the art, the opposite polarity potentials will be summed by the amplifier circuit to provide an output potential from the amplifier commensurate with the quantity $-2X_e+X_m$. This potential is applied to excite the winding of linear potentiometer R–42, the wiper arm of which is positioned by the mechanical analog quantity $X_m$, thereby providing an output potential from the arm of potentiometer R–42 commensurate with the quantity $(2X_e-X_m)X_m$.

From Expression 2 supra, it may be seen that:

$$(2X_e-X_m)X_m=[2X_e-X_e(1-E)]X_m$$

$$[2X_e-X_e(1-E)]X_m=X_e(1+E)X_e(1-E)$$

$$X_e(1+E)X_e(1-E)=X_e^2(1-E^2)$$

Comparison of the output quantity $X_e^2(1-E^2)$ with the theoretically correct squared $X_e^2$ indicates that the error in the squared quantity derived in accordance with the invention amounts to $(-E^2X_e^2)$. Realizing that the error E is a small fraction, commonly less than .10 in most computer applications, it will be seen that the error quantity $(-E^2X_e^2)$ associated with the invention will be much smaller than the error quantities which attend use of the prior art means described, since squaring a small fraction results in a very small fraction. Thus the invention provides squared quantity output potentials which are considerably more accurate than those provided by the prior art.

In constructing squaring circuits in accordance with the invention, various well-known analog computer techniques may be employed. For example, the "double scaling" of the potential applied via resistor R–43 may be accomplished by use of a buffer amplifier having a gain of two connected between terminal 40 and resistor R–43, in which case scaling resistors R–43 and R–44 would have equal resistance. Instead, a buffer amplifier or cathode follower having a gain of .50 could be used between the arm of potentiometer R–41 and scaling resistor R–44, and equal value resistors could be used for resistors R–43 and R–44. The requirement merely is that the electrical analog quantity input potential to summing means U–40 from resistor R–43 vary twice as much per unit of the quantity represented as the opposite sense electrical analog quantity input potential from resistor R–44. The potentiometers and summing means indicated by Fig. 2 are completly conventional and may take various forms. Series summing may be substituted without departing from the invention, and the invention is applicable to both direct current and alternating current computers and control apparatus. While we have described the potentiometers used as linear, it should be understood that such potentiometers may include certain winding non-linearities intentionally introduced to compensate for loading, so that the voltage versus shaft rotation characteristics of such potentiometers are substantially linear when the potentiometers are loaded. Furthermore, it will have become apparent as a result of this disclosure that potential dividers other than potentiometers may be substituted without departing from the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. Apparatus for providing an output potential commensurate with the square of a variable, comprising means for deriving a first potential commensurate with said variable, a first potentiometer excited independently of said variable having its arm mechanically positioned in accordance with a mechanical analog of said variable to derive a second potential of opposite sense, said first potential varying twice as much in accordance with changes of said independent variable as said second potential, potential summing means responsive to said first and second potentials and operative to provide a third potential commensurate with the algebraic sum of said potentials, and a second potentiometer connected to be excited by said third potential and having its wiper arm positioned by said mechanical analog, thereby deriving a potential on said wiper arm of said second potentiometer substantially commensurate with the square of said variable.

2. Electrical analog computer squaring apparatus comprising in combination input circuit means responsive to an electrical voltage analog of a variable for applying a first potential to a potential summing circuit, first potentiometer means positioned by a mechanical analog of said variable for deriving and applying a second potential of opposite sense to said potential summing circuit, said first potential being scaled to vary twice as much per unit change of said variable as said second potential, and second potentiometer means excited by said summing circuit and positioned by said mechanical analog of said variable.

3. Apparatus according to claim 2 in which said input circuit means comprises a first scaling resistance having a selected conductance and in which said first potentiometer means is connected to said summing circuit through a second scaling resistance having substantially one half said selected conductance.

References Cited in the file of this patent

Electronic Analog Computers (Korn and Korn), 1952, page 43.

Tele-Tech and Electronic Industries (Levenstein), October 1953, pages 76–78.